(12) United States Patent
Borish et al.

(10) Patent No.: US 7,867,412 B2
(45) Date of Patent: Jan. 11, 2011

(54) COMPOSITION AND METHOD FOR SUPPRESSING WATER EVAPORATION AND HEAT LOSS

(75) Inventors: Edward T. Borish, Westerville, OH (US); Jonathan Dean, Franklin, NJ (US)

(73) Assignee: Clearwax LLC, Franklin, NJ (US)

( * ) Notice: Subject to any disclaimer, the term of this patent is extended or adjusted under 35 U.S.C. 154(b) by 870 days.

(21) Appl. No.: 11/647,852

(22) Filed: Dec. 29, 2006

(65) Prior Publication Data

US 2007/0152190 A1 Jul. 5, 2007

Related U.S. Application Data

(60) Provisional application No. 60/755,307, filed on Dec. 30, 2005.

(51) Int. Cl.
*C09K 3/00* (2006.01)

(52) U.S. Cl. .................. 252/384; 252/383; 252/382; 252/62.3 Q; 252/88.1; 422/42; 422/43

(58) Field of Classification Search ................ 252/384; 422/43, 42
See application file for complete search history.

(56) References Cited

U.S. PATENT DOCUMENTS

| | | | |
|---|---|---|---|
| 2,903,330 A | 9/1959 | Dressler | |
| 3,036,880 A | 5/1962 | Malkemus | |
| 3,146,059 A | 8/1964 | Suzuki et al. | |
| 3,241,908 A | 3/1966 | Mazur et al. | |
| 3,257,162 A | 6/1966 | Cox | |
| 3,324,038 A * | 6/1967 | Meyer et al. | 510/439 |
| 3,391,987 A | 7/1968 | Myers | |
| 3,415,614 A | 12/1968 | Egan et al. | |
| 3,437,421 A | 4/1969 | Harwood | |
| 3,459,670 A * | 8/1969 | Carter, Jr | 510/379 |
| 3,463,734 A * | 8/1969 | Carter, Jr et al. | 510/379 |
| 3,528,764 A | 9/1970 | Reiser | |
| 3,531,239 A | 9/1970 | Rowlette | |
| 3,650,980 A | 3/1972 | Gothel et al. | |
| 3,796,759 A * | 3/1974 | Priestley et al. | 568/27 |
| 3,959,154 A | 5/1976 | Cox | |
| 4,146,499 A * | 3/1979 | Rosano | 252/186.32 |
| 4,162,990 A | 7/1979 | Rowlette | |

(Continued)

FOREIGN PATENT DOCUMENTS

GB 1557804 12/1979

*Primary Examiner*—Joseph D Anthony
(74) *Attorney, Agent, or Firm*—Law Offices of Mitchell P. Novak; Benjamin Appelbaum

(57) ABSTRACT

A composition for retarding water loss and/or heat loss from a body of water comprises a polyoxyethylene ether having the general structure of R—$(OCH_2CH_2)_n$OH where R is an alkyl group or mixture of alkyl groups, and n is the average number of ethylene oxide units in the polyethylene glycol segment, wherein R is lauryl alcohol and n is 2. The composition can be delivered as a neat liquid, solution, or dispersion in a solvent or carrier, without additional dispersants or spreading agents, and without hazardous or flammable solvents. Embodiments may include a thickening agent to stabilize the dispersion until use. Preservatives, colorants and fragrance can be added. The range for delivery of the composition in dilution is from about 0.1% to about 90% by weight in one embodiment, and from about 0.5% to about 50% by weight, and from about 1% to about 20% by weight in other embodiments.

3 Claims, 1 Drawing Sheet

U.S. PATENT DOCUMENTS

| | | |
|---|---|---|
| 4,172,058 A | 10/1979 | Hall |
| 4,250,140 A | 2/1981 | Rowlette |
| 4,707,359 A | 11/1987 | McMullen |
| 4,932,994 A | 6/1990 | Koester et al. |
| 5,085,857 A * | 2/1992 | Reid et al. ............... 424/70.12 |
| 5,152,914 A * | 10/1992 | Forster et al. ............... 510/122 |
| 5,246,694 A * | 9/1993 | Birthwistle ............. 424/70.12 |
| 5,500,152 A * | 3/1996 | Helliwell .................... 510/403 |
| 6,248,708 B1 * | 6/2001 | Merz et al. ................. 510/404 |
| 6,277,154 B1 * | 8/2001 | Lorenz ......................... 8/405 |
| 6,303,133 B1 | 10/2001 | O'Brien |
| 6,329,333 B1 * | 12/2001 | Merz et al. ................. 510/336 |
| 6,660,045 B1 * | 12/2003 | Hoeffkes et al. .............. 8/405 |
| 2004/0234471 A1 * | 11/2004 | Corbella et al. ............ 424/70.1 |

* cited by examiner

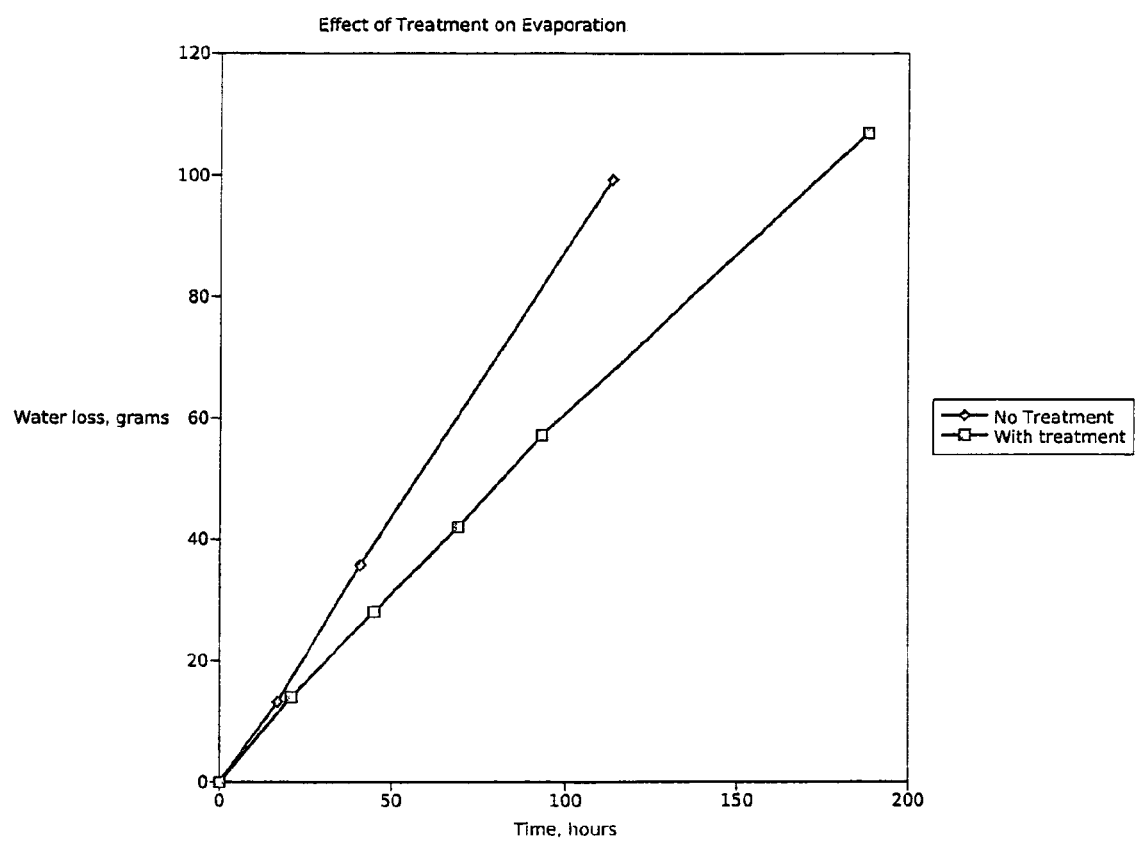

COMPOSITION AND METHOD FOR SUPPRESSING WATER EVAPORATION AND HEAT LOSS

CROSS REFERENCES TO RELATED APPLICATIONS

This application claims the benefit of U.S. Provisional Patent Application Ser. No. 60/755,307, filed 30 Dec. 2005, the contents of which are hereby incorporated by reference in their entirety.

FIELD OF THE INVENTION

Embodiments of the present invention relate to a composition and method for suppressing water evaporation and heat loss from bodies of water, such as swimming pools, reservoirs, or lakes, for example.

BACKGROUND OF THE INVENTION

Embodiments of this invention include an improved composition and method for suppressing water evaporation and heat loss.

The need to prevent evaporation of water from various bodies of water is known, and this is important in areas that, for example only, are generally hot, that receive little annual rainfall, or little seasonal rainfall, or which are subject to periodic droughts or water shortages. This is necessary to provide water for such purposes as drinking, irrigating crops or vegetable gardens, or other needs. In addition, where the body of water needs to be maintained at a certain temperature, such as for example, a pool for therapeutic purposes, there can be a significant cost associated with maintaining that particular temperature. Consequently, a number of agents have been developed to apply to various sized bodies of water to suppress either or both of water loss by evaporation and heat loss from such water bodies.

The use of long-chain, solid, aliphatic fatty alcohols, particularly of chain length $C_{16}$ and $C_{18}$, commonly known as, respectively, cetyl alcohol and stearyl alcohol, are known in the prior art for suppressing water evaporation. However issues with dispensing these materials present hurdles to their use in practice under actual use conditions. Attempts to overcome these hurdles have involved a number of approaches. The prior art teaches the need to combine these materials with solvents and dispersants or spreading agents to make their use practical under actual use conditions. These prior art compositions involve heating, combining and dispensing materials at high temperatures (between about 70 degrees C. to about 100 degrees C.). Compositions are delivered as dispersions, emulsions, solutions or solids.

U.S. Pat. Nos. 4,162,990 and 4,250,140 teach that the smallest chain length that can seriously be regarded as an evaporation retardant is $C_{16}$. Surprisingly, the present inventors find that Laureth-2 with a carbon length of $C_{12}$ performs unexpectedly well for suppressing water evaporation and heat loss.

Reiser (U.S. Pat. No. 3,528,764) discloses a method and apparatus for retarding water evaporation from water surfaces through the use of solid fatty alcohols delivered as a dispersion. Alternatively an emulsion can be formed from the dispersion by including a surfactant such as ethoxy derivatives of fatty alcohols. The inventor specifically indicates a preference to use a fatty alcohols having from 16 to 18 carbon atoms.

O'Brien (U.S. Pat. No. 6,303,133 B1) discloses a composition that forms a monolayer to suppress water evaporation, comprising an aliphatic alcohol component having from $C_{12}$-$C_{24}$ and powdered calcium hydroxide. Cetyl alcohol and octadecanol can be used; cetyl alcohol (hexadecanol) having a chain length of $C_{16}$ is preferred.

Rowlette (U.S. Pat. No. 4,162,990) discloses using a polyethylene glycol that is soluble in both water and the fatty alcohol (such as docosanol, docosanoic acid or octadecanol) as a spreading agent for the fatty alcohol on the surface of a body of water. The particles are mixed with particles of a filler material capable of generating a gas upon contact with water.

In U.S. Pat. No. 4,250,140 Rowlette discloses using a polyethylene glycol, such as those in the CARBOWAX® series (Registered trademark of Union Carbide Chemicals & Plastics Technology Corp., Danbury, Conn.), as a spreading agent for a film-forming agent. This patent states that $C_{16}$ is the smallest chain length that can seriously be regarded as an effective evaporation retardant.

U.S. Pat. No. 3,531,239 indicates that various fatty alcohols, such as octadecanol, hexadecanol, nonadecanol, and pentadecanol could be used as evaporation retardants for water although the inventor states that a chain length from $C_{16}$ to $C_{18}$ are generally preferred.

Egan (U.S. Pat. No. 3,415,614) discloses the addition of a heterocyclic, 5-membered ring compound, one of which is oxygen, to at least one solid aliphatic alcohol ranging from C12-C20, to form a solid, self-dispersing composition. The aliphatic alcohols include myristyl, cetyl and stearyl alcohols and mixtures thereof. The most preferred composition comprises cetyl and stearyl alcohols which retards evaporation by about 30-40%.

In U.S. Pat. No. 3,391,987 Myers discloses compositions using water-soluble saccharides as carriers for the fatty alcohols where hexadecanol and octadecanol with chain lengths C16 and C18 are especially preferred. Unsaturated alcohols such as oleyl alcohol may be used, but are not preferred.

Cox (U.S. Pat. No. 3,257,162) discloses glycol esters, glycol amides and ethoxylated amides and ethoxylated derivatives thereof that are effective in retarding evaporation of aqueous solutions of normally volatile organic substances.

In U.S. Pat. No. 3,959,154 Cox discloses agents to retard the evaporation of ammonia and amines from essentially aqueous solutions by adding thereto an alkyl ether having the formula:

$$R-(O[CH_2]_y)_n-R'$$

where

R is an alkyl group containing from 8 to 30 carbon atoms, and

R' is an —OH or —NH$_2$ group, y is an integer of 2 to 4; and n is an integer of 1 to 10.

The inventor notes that the utility of these compositions is predicated on the fact that they effect the evaporation of dissolved ammonia or amines to a far larger extent than their effect on the evaporation of water.

In U.S. Pat. No. 2,903,338 Dressler discloses the use of finely divided and wetted/suspended fatty acid alcohols, preferably $C_{16}$ to $C_{18}$, dispersed in water or emulsified with sodium lauryl sulfate or sodium dodecylbenzene sulfonate to form a film that leads to a reduction in water loss by evaporation.

Malkemus (U.S. Pat. No. 3,036,880) discloses the use of ethylene glycol and propylene glycol monoesters of long chain fatty acids to form films on the surface of water. The patentee notes that the fatty acid must have at least 14 carbon atoms since esters from the lower acids do not appear to offer any advantages. Benzene is the preferred solvent.

In U.S. Pat. No. 3,146,059 Suzuki et al. disclose the use of derivatives of aliphatic alcohols with carbon chain lengths of 22 to 16 or docosanol to cetanol in compositions for retarding water evaporation. The claims are addressed to longer chain structures, having the general formula:

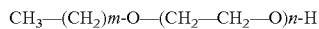

where m is 15-21; and n is 1-5, which may be mixed with a compound such as urea, salts of carboxymethylcellulose or alginic acid. Fatty alcohol derivatives of this invention with 1 mole of ethylene oxide showed an average reduction in the evaporation rate of water of 56%, 22%, 6% respectively for $C_{22}$, $C_{18}$, $C_{16}$. Furthermore, evaporation rate reduction decreased from an average of 56% for 1 mole of ethylene oxide to about 9% for 5 moles of ethylene oxide. Taken together these results clearly indicate that the expected effect on the evaporation rate of water for ethoxylates of fatty alcohols with a carbon chain length less than $C_{16}$ would be close to zero! Thus it would be very surprising and unexpected that a fatty alcohol ethoxylate with a carbon chain length of $C_{12}$ and 2 moles of ethylene oxide, such as Laureth-2 would have any effect on the evaporation rate of water.

Mazur (U.S. Pat. No. 3,241,908) discloses a method for preparing a monomolecular film former for controlling evaporation from water surfaces, using fatty acid alcohols such as n-hexadecanol and n-octadecanol, which show a 25-35% reduction in the evaporation rate of water.

In U.S. Pat. No. 3,437,421 Harwood discloses the use of long chain aliphatic alcohols as agents for retarding water evaporation and a method by which solid long-chained alcohols are liquefied by heating and then sprayed onto the surface of a body of water. The preferred compounds were the $C_{16}$ and $C_{18}$ compounds hexadecanol and octadecanol; unsaturated alcohols, such as oleyl alcohol, had a lower efficiency than the saturated alcohols.

In U.S. Pat. No. 3,650,980 Gothel et al. disclose a film forming composition to retard evaporation loss that comprises a higher alkyl alcohol and up to three weight percent of an ortho-silicic acid ester of an ethoxylated alcohol. Ethoxylated lauryl- as well as stearyl-alcohols are stated to be of restricted applicability as non-ionic surfactants.

Hall (U.S. Pat. No. 4,172,058) discloses the use of a mixture of hexadecanol and octadecanol, both as a mixture of liquids, or a dry mixture thereof, as a composition to retard evaporation of fluid from an aqueous mixture containing "H-SPAN", a hydrolyzed starch-polyacrylonitrile graft copolymer.

In U.S. Pat. No. 4,707,359 McMullen discloses the use of fatty acid alcohols in conjunction with an insecticide to form a layer on a water surface and kill insects, such as mosquitoes. The particular compounds are described in Great Britain Pat. No. 1,557,804A, with the composition including an oleyl poly-ethoxy, poly-propoxy mixed ether. The composition may include a solvent, such as water, kerosene, hexane deiselene, heptane and gas oil.

Koester et al. (U.S. Pat. No. 4,932,994) disclose a paraffin-containing aqueous dispersion or a self-emulsifying solution in an organic solvent, to form films on the surface of water.

In contrast to the prior art compositions, embodiments of the present invention utilize polyoxyethylene alkyl ethers with carbon chain lengths less than $C_{16}$ as the active agent. For example, polyoxyethylene (2) lauryl ether is a polyoxyethylene lauryl ether having a carbon chain length of $C_{12}$ with 2 moles of ethylene oxide which performs unexpectedly well for suppressing water evaporation and heat loss. Furthermore, because it is a liquid at ambient conditions and is self-dispersing, it can be used as is, without the need for any further processing, without the need for any added solvents, carriers, dispersants or spreading agents, and without the need for any specialized equipment for application.

The fatty alcohol ethoxylate can be delivered in one of several forms: a neat liquid, a solution, or a dispersion in an appropriate solvent or carrier, without the need of any additional dispersant or spreading agent.

The range for delivery of the fatty alcohol ethoxylate in dilution is from about 0.1% to about 90% by weight in one embodiment of the invention. In another embodiment, the range for delivery of the fatty alcohol ethoxylate is from about 0.5% to about 50% by weight, and in another embodiment, the range for delivery of the fatty alcohol ethoxylate is from about 1% to about 20% by weight.

In one embodiment, the fatty alcohol ethoxylate is delivered as a suspension in water, thereby avoiding the use of hazardous or flammable solvents.

Additional embodiments may use a thickening agent of sufficient yield to stabilize the dispersion until use. Other ingredients such as preservatives, colorants and fragrance can be added to the composition as desired.

BRIEF SUMMARY OF THE INVENTION

An object of the present invention is to provide a composition that can be used to reduce the evaporation of water from a body of water.

Another object of the present invention is to provide a composition that can be used to reduce heat loss from a body of water.

Another object of the present invention is to provide a composition to reduce water evaporation and/or heat loss that does not require the use of volatile or flammable solvents.

Still another object of the present invention is to provide a fatty alcohol ethoxylate composition to reduce water evaporation and/or heat loss that can be delivered in the form of either a neat liquid, a solution, or as a dispersion in an appropriate solvent or carrier, without the addition of any additional dispersant or spreading agent.

Still another object of the present invention is to provide a fatty alcohol alkoxylate composition to reduce water evaporation and/or heat loss that can be delivered in the form of either a neat liquid, a solution, or as a dispersion in an appropriate solvent or carrier, without the addition of any additional dispersant or spreading agent.

BRIEF DESCRIPTION OF THE SEVERAL VIEWS OF THE DRAWING

FIG. 1 illustrates the effect of treating water with an embodiment of the present invention on evaporation of the water.

DETAILED DESCRIPTION OF THE INVENTION

Embodiments of the present invention utilize fatty alcohol ethoxylates in a composition to reduce water loss from a body of water, and also to reduce heat loss from the body of water. In embodiments of the present invention, the extent of ethoxylation of the fatty acid alcohol is sufficient to render the fatty alcohol ethoxylate water dispersible, rather than its' being insoluble, but the extent of ethoxylation is not great enough so the fatty alcohol ethoxylate is water-soluble. Consequently, the fatty alcohol ethoxylate can be delivered as a neat liquid, or if desired as a solution or dispersion in an appropriate solvent or carrier. An advantage of embodiments of the invention is that no added dispersant or spreading agent is required. In one embodiment, the range of the fatty alcohol ethoxylate for delivery in dilution is from about 0.1% to about 90% by weight. In another embodiment, the range for delivery in dilution is from about 0.5% to about 50% by weight. In yet another embodiment, the range for delivery in dilution is from about 1% to about 20% by weight.

In one embodiment, the composition is employed as a suspension in water. The use of the composition as an aqueous suspension avoids the use of hazardous or flammable solvents such as, for example only, isopropanol, hexane, benzene, furans or the like. In this embodiment, a thickening or suspending agent may be used to stabilize the dispersion until use. In addition, other agents such as a preservative, color, and fragrance can be added as needed.

The Hetoxol product line represents various condensation products from the reaction of either ethylene oxide or propylene oxide and a fatty alcohol known generally as polyoxyalkylene alkyl ethers.

An exemplary polyoxyethylene (2) lauryl ether, employed in embodiments of the present invention, is sold under the tradename of Hetoxol L-2. It is the product of the reaction between ethylene oxide and lauryl alcohol (having a chain length of $C_{12}$), and is also referred to herein as polyoxyethylene (2) lauryl ether.

The chemical formula is shown below, as $$R-(OCH_2CH_2)_n OH$$

where

R is an alkyl group or mixture of alkyl groups having a chain length less than $C_{16}$; and n is the average number of ethylene oxide units in the polyethylene glycol segment of the molecule, and is between 1 & 5 inclusive.

R can range from alkyl groups having carbon chain lengths varying from $C_6$ to $C_{14}$. In an embodiment of the present invention, R can range from $C_{10}$ to $C_{14}$. In an embodiment of the present invention, n can range from 1 to 4 and in another embodiment, n can range from 1 to 3. In one embodiment of the present invention, R is a lauryl group ($C_{12}$) and 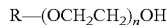 is 2. Polyoxyethylene (2) lauryl ether is also referred to as Laureth-2 (INCI Nomenclature, International Nomenclature of Cosmetics Ingredients, formerly the CTFA Dictionary), PEG-2 Lauryl Ether and others. It is assigned CAS Numbers 3055-93-4, 9002-92-0(g), EINECS Number 221-279-7 and is reported to have a calculated HLB value of 6.1 and is generally liquid at a temperature of 25 degrees C.

The fatty alcohol ethoxylate can be delivered in one of several forms: a neat liquid, a solution, an emulsion or a dispersion in an appropriate solvent or carrier, without the addition of any additional dispersant or spreading agent.

One embodiment also utilizes a thickening agent of sufficient yield to stabilize the dispersion until use. Other ingredients such as, but not limited to, preservatives, colorants and fragrance can be added to the composition as desired. According to Table 1, the active agent is polyoxyethylene (2) lauryl ether.

Additional embodiments could include alkyloxides of other chain lengths. Examples of such alkyloxides include, but are not intended to be limited to propylene oxide, butylene oxide, pentylene oxide, hexylene oxide, octylene oxide, and decylene oxide. In these embodiments, the polyoxyalkylene ether has the general structure of $$R-R'_n OH$$

wherein

R is an alkyl group or mixture of alkyl groups having a carbon chain length that is less than $C_{16}$;

R' is an alkylene oxide; and n is the average number of ethylene oxide units, and n ranges from 1 to 5.

R can range from alkyl groups having carbon chain lengths varying from $C_6$ to $C_{14}$. In an embodiment of the present invention, R can range from $C_{10}$ to $C_{14}$. In an embodiment of the present invention, n can range from 1 to 4 and in another embodiment, n can range from 1 to 3. In one embodiment of the present invention, R is a lauryl group ($C_{12}$) and  is 2.

The composition can be prepared in a number of different ways including but not limited to the following. For example the composition can be prepared by first mixing the viscosifier/yield agent with water, adding the polyoxyethylene (2) lauryl ether with mixing until the material is uniform, and adding other desired agents, and pH adjustment as desired, until the composition is uniform. Alternatively, the polyoxyethylene (2) lauryl ether might be added to the composition as the last ingredient. One skilled in the art may devise other methods to prepare compositions of and practice this invention without undue experimentation and without departing from the spirit and scope of this invention.

For pH adjustment, any agent commonly used in the laboratory for pH adjustment, such as hydrochloric acid or sodium hydroxide, can be used. Other acids such as acetic acid, benzoic acid, formic acid, fumaric acid, lactic acid, phosphoric acid, sulfuric acid or other organic and/or inorganic acids, as known to those skilled in the art, could also be used. Other bases such as ammonium hydroxide, ethanolamine, magnesium hydroxide, sodium or potassium bicarbonate, sodium or potassium hydroxide, organic and/or inorganic bases, as known to those skilled in the art, could also be used. Depending upon the particular viscosifier employed in the compositions, other agents for adjusting pH could also be used. A propanol derivative, such as aminomethyl propanol, may be used to adjust the pH when a CARBOPOL® is used as the viscosity modifying agent.

To facilitate maintaining the active agent in suspension during storage, shipment or prior to use, one or more of a number of viscosity modifying agents ("viscosifiers") can be added to the composition. These viscosifiers can be obtained from various commercial sources, including but not limited to those listed in the CTFA INCI Dictionary, the relevant sections being incorporated by reference herein. For example only, and not intended as any limitation, examples of viscosifiers that could be utilized include carageenans; cellulose compounds such as methyl cellulose, hydroxymethyl cellulose, and carboxymethyl cellulose; pectin; dextrans of various molecular weight ranges; starch; gum tragacanth; gum arabic; guar gum; acacia gum; gum karaya; silica, diatomaceous earth; and other commonly used agents known to those skilled in the art. The viscosifier is generally added to the composition in the range recommended by its' manufacturer, and in an embodiment of the present invention, this generally ranges from about 0.1% to about 1.0%. One example of a viscosifier that can be used is an Acrylate/C10-30 Alkyl Acrylate Crosspolymer (CTFA-INCI nomenclature); it is a member of the class of viscosifiers sold commercially under the trade name CARBOPOL® (registered trademark of Noveon, Inc., Cleveland, Ohio).

In other embodiments, the viscosifier range can be from about 0.001% to about 10%, depending upon the combination of viscosifier employed, and the other agents contained within the composition, as recommended by the product manufacturers, and known to those skilled in the art.

One or more preservatives can be added to the composition. These preservatives can be obtained from various commercial sources, including but not limited to those listed in the CTFA INCI Dictionary, the relevant sections being incorporated by reference herein. Examples of such preservatives are butylated hydroxyanisole ("BHA"), butylated hydroxytoluene ("BHT"), phenol, resorcinol; parabens such as methyl paraben, ethyl paraben, propyl paraben or butyl paraben; 2-phenoxyethanol, 1,3-octandiol; or other preservatives commonly used in the industry. The general range for addition of preservatives is from about 0.01% to about 10% by weight of the composition. In one embodiment of the present invention, the preservative is added in the range of about 0.01% to about 1% by weight of the composition, and in another embodiment the preservative is added in the range of about 0.1% to about 0.6% by weight of the composition.

In one embodiment of the present invention, the preservative used is 1,3-Dimethylol-5,5-Dimethyl Hydantoin (CFTA-ICNI nomenclature of DMDM Hydantoin), and is sold commercially under the trade name GLYDANT® (registered trademark of Lonza, Inc., Fair Lawn, N.J.), and used in accordance with the manufacturer's specifications.

A colorant can be added to the composition if desired. One or more colorants can be added to the composition, and without specifying any one in particular, it is to be understood that these colorants can be obtained from various commercial sources, including but not limited to those listed in the CTFA INCI Dictionary, the relevant sections being incorporated by reference herein. The colorant can be added to the composition in a range from about 0.00001% to about 5%, as known to those skilled in the art. In one embodiment of the present invention, the colorant is used in the range of about 0.0001% to about 0.0005%.

A fragrance can be added to the composition if desired. One or more fragrances can be added to the composition, and without specifying any one in particular, it is to be understood that these fragrances can be obtained from various commercial sources, such as, for example only, International Flavors and Fragrances (New York, N.Y.), or including but not limited to those listed in the CTFA INCI Dictionary, the relevant sections being incorporated by reference herein. The fragrance can be added to the composition in a range from about 0.001% to about 20%, as known to those skilled in the art. Examples of fragrances that could be used include, for example only, and are not intended to be limitations, ammonium glycyrrhizate, amyl acetate, anisaldehyde, benzoic acid, *betula alba* extract, caraway fruit oil, safflower seed oil, caramel, cedarwood oil, cinnamyl acetate, citrus extracts such as from orange, grapefruit, lemon or lime, citronella, carrot, clove, eucalyptus, wintergreen, licorice, lavender, cherry, various berries or the like.

The composition can be distributed onto a body of water using a variety of means. Examples of such bodies of water include swimming pools, lakes, lagoons, ponds, reservoirs, rice paddies, and the like. Depending upon their size and water flow, bodies of water such as a harbor or a bay could also be treated with embodiments of the present invention. A water tank or other storage vessel or storage tank, for either water or other solutions, can be treated with an embodiment of the present invention to retard evaporation and heat loss.

In the example of a swimming pool, whose general structure commonly includes at least a pump, a filter, and a skimmer mechanism, interconnected by the appropriate plumbing, an embodiment of the present invention can be placed into the pool's skimmer mechanism, from which it is dispersed onto the water's surface. For treating a body of water other than a swimming pool, such as a reservoir or pond, embodiments of the present invention are distributed onto the water's surface by, for example, being sprayed onto the surface from an aircraft such as an airplane or helicopter; deposited into one or more buoys containing a vessel which will release the composition into the water; depositing one or more vessels containing the composition into the water, the vessels having pores or the like to release the composition onto the water's surface, or distributed by being applied to a water surface.

EXAMPLE 1

Preparation of Polyoxyethylene (2) Lauryl Ether Composition

To prepare the composition, the viscosifier/yield agent is added to water, and slowly mixed to avoid incorporation of air. The polyoxyethylene (2) lauryl ether is then added to the admixture, and with slow mixing, the mixture is stirred until it is uniform.

At this point, the pH is adjusted to between about 6-7, and mixing is continued until the admixture is uniform.

If an embodiment of the composition is to include other agents, such as a preservative, a colorant, a fragrance or the like, then these agents are added to the admixture after the polyoxyethylene (2) lauryl ether has been added and mixed in, but before the pH of the composition is adjusted.

Table 1 lists the composition of one embodiment of the invention.

TABLE 1

Composition of An Embodiment of This Invention

| INGREDIENT | Concentration | Preferred Concentration |
|---|---|---|
| Viscosifier/Yield Agent | QS as desired | QS as desired |
| Polyoxyethylene (2) Lauryl Ether | 0.1-90% by weight | 0.5-50% by weight |
| Color | QS as desired | QS as desired |
| Preservative | 0.01-10% by weight | 0.1-0.6% by weight |
| Fragrance etc. | QS as desired | QS as desired |
| Alkali and/or acid | QS to desired pH | QS to desired pH |
| Water | QS to 100% | QS to 100% |

EXAMPLE 2

Effect of Composition on Water Evaporation and Heat Loss

To determine the efficacy of an embodiment of the present composition, three swimming pools, having similar size, volume and surface area were employed. Daily air and water temperature readings were recorded for each pool at 6 A.M. (referred to as "Low" in Table 2) and 6 P.M. (referred to as "High" in Table 2) for a period of 11 days. Baseline temperatures were established for each pool for a 4 day period. On day 5, two of the pools were treated by adding 8 ounces of an embodiment of the present invention through each pool's skimmers. The third pool was used as a control and was not treated; the data is summarized in Table 2.

Table 2 demonstrates the effectiveness of an embodiment of the present invention in suppressing temperature loss from water in swimming pools. The air temperature was the same for all 3 pools, with a high of 93 degrees F. and a low of 78 degrees F. The pool water temperatures were initially the same for all three pools, and constant throughout the test at the control pool with a high of 86 degrees F. and a low of 84 degrees F. Treatment with this embodiment resulted in pool temperatures that remained higher and more constant than pools that were not treated. Variation in pool temperature was reduced by approximately 50%, with pool temperatures remaining about 2-3 degrees F. higher in the treated pools.

TABLE 2

| Effect of Treatment on Heat Loss | | |
|---|---|---|
| Pool | Pool Temp. High | Pool Temp. Low |
| Untreated | 86° F. | 84° F. |
| Treated | 88° F. | 87° F. |

EXAMPLE 3

Effect of Polyoxyethylene (2) Lauryl Ether on Water Evaporation

To test the efficacy of the embodiment prepared in Example 1 for its effects on water evaporation, approximately 1 kilogram of water was added to each of two 1 kilogram beakers. The water was weighed accurately prior to addition to the beakers. To one beaker a 0.05 g sample of an embodiment of the invention, as neat laureth-2, was added. The beakers were placed in an oven at a temperature ranging from 28-30 degrees C., were periodically removed, and reweighed to determine the rate of water evaporation. The results (FIG. 1) demonstrate that the rate of water evaporation is reduced by approximately 30-40%.

An aspect of the present invention is that the inventive composition can be delivered as an aqueous dispersion. This overcomes problems associated with solids or the need for using flammable and toxic solvents, such isopropanol or hexane. This aqueous dispersion can be stabilized with a thickening agent with sufficient yield value to maintain uniformity until the time of use. Alternatively, it can be delivered as a neat liquid having the advantage over other materials in the prior art since it is a liquid at ambient conditions and this does not require any added dispersant or solvent. Alternatively, if desirable it can be delivered as a dilute solution using an appropriate solvent.

Therefore, although this invention has been described with a certain degree of particularity, it is to be understood that the present disclosure has been made only by way of illustration, and that numerous changes in the details of construction and arrangement of parts may be resorted to without departing from the spirit and scope of the invention.

We claim:

1. An aqueous dispersion to retard the rate of water loss and/or heat loss from a body of water, the dispersion consisting essentially of:

a polyoxyethylene ether having the general structure of

wherein R is a lauryl alcohol group ($Cl_{12}$); and
n is the average number of ethylene oxide units, and n is 2;
wherein the polyoxyethylene ether comprises from about 0.1% to about 90% by weight of the composition;
an aqueous solvent; and
from about 0.001% to about 10% of a viscosity modifying/yield agent, the viscosity modifying/yield agent being added in a quantity sufficient to stabilize the composition as an aqueous dispersion, the viscosity modifying/yield agent is chosen from the group consisting of acrylate/alkyl crosspolymers, homopolymers and/or copolymers of acrylic acid crosslinked with a polyalkyenyl polyether, carageenans, methyl cellulose, hydroxymethyl cellulose, and carboxymethyl cellulose, pectin, dextrans, starch, gum tragacanth, gum Arabic, guar gum, acacia gum, gum karaya, silica, and diatomaceous earth.

2. An aqueous dispersion to retard the rate of water loss and/or heat loss from a body of water, the dispersion consisting essentially of:

a polyoxyalkylene ether having the general structure of

wherein R is an alkyl group or mixture of alkyl groups having a carbon chain length that ranges from $C_8$ to $C_{14}$;
R' is an alkylene oxide group;
n is the average number of alkylene units, and n ranges from 1 to 5;
wherein the polyoxyalkylene ether comprises from greater than 1% to about 90% by weight of the composition;
an aqueous solvent; and
from about 0.001% to about 10% of a viscosity modifying/yield agent, the viscosity modifying/yield agent being added in a quantity sufficient to stabilize the composition as an aqueous dispersion, the viscosity modifying/yield agent is chosen from the group consisting of acrylate/alkyl crosspolymers, homopolymers and/or copolymers of acrylic acid crosslinked with a polyalkyenyl polyether, carageenans, methyl cellulose, hydroxymethyl cellulose, and carboxymethyl cellulose, pectin, dextrans, starch, gum tragacanth, gum Arabic, guar gum, acacia gum, gum karaya, silica, and diatomaceous earth.

3. The dispersion as described in claim 2, wherein R is a laurel alcohol group ($C_{12}$).

* * * * *